US011635305B2

(12) United States Patent
Nakahara

(10) Patent No.: US 11,635,305 B2
(45) Date of Patent: Apr. 25, 2023

(54) INFORMATION PROCESSING APPARATUS AND NON-TRANSITORY COMPUTER READABLE MEDIUM

(71) Applicant: FUJIFILM Business Innovation Corp., Tokyo (JP)

(72) Inventor: Toshiaki Nakahara, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 605 days.

(21) Appl. No.: 16/547,589

(22) Filed: Aug. 22, 2019

(65) Prior Publication Data

US 2020/0300661 A1 Sep. 24, 2020

(30) Foreign Application Priority Data

Mar. 20, 2019 (JP) .............................. JP2019-053403

(51) Int. Cl.
*G01D 1/16* (2006.01)

(52) U.S. Cl.
CPC ..................................... *G01D 1/16* (2013.01)

(58) Field of Classification Search
CPC .......... G01D 1/16; G01D 18/00; G01D 21/00; G01D 1/00; G01D 11/00; G01D 3/10; H04N 1/00034; H04N 1/00244; H04N 1/00405; G06F 3/1204; G06F 11/3452; G06F 11/3466; G05B 23/024; G06Q 10/06; G06Q 10/0639

(Continued)

(56) References Cited

U.S. PATENT DOCUMENTS

| 7,191,143 B2 * | 3/2007 | Keii ....................... G06Q 10/06 705/7.32 |
| 2005/0102052 A1 * | 5/2005 | Yoshida .................. G06F 9/445 700/95 |

(Continued)

FOREIGN PATENT DOCUMENTS

| CN | 101657790 A | * 2/2010 | ............. B41J 2/525 |
| JP | 2004054358 | 2/2004 | |

(Continued)

OTHER PUBLICATIONS

Office Action of Japan Counterpart Application, with English translation thereof, dated Jan. 31, 2023, pp. 1-6.

*Primary Examiner* — Jeffrey P Aiello
(74) *Attorney, Agent, or Firm* — JCIPRNET

(57) ABSTRACT

An information processing apparatus includes a memory in which processing instruction information including data to be processed and setting information is stored; a first executing unit that executes processing of the data to be processed on a basis of a first product and the setting information; a first measurement unit that measures a predetermined item concerning a first processing result of the first executing unit; a second executing unit that executes processing of the data to be processed on a basis of a second product and the setting information; a second measurement unit that measures the item concerning a second processing result of the second executing unit; and an output unit that outputs a result of comparison between the first processing result and the second processing result on a basis of a measurement result of the first measurement unit and a measurement result of the second measurement unit.

2 Claims, 10 Drawing Sheets

(58) Field of Classification Search
USPC .......... 358/1.13; 700/109–110; 702/81, 108, 702/127, 155, 182, 189; 717/124
See application file for complete search history.

(56) References Cited

U.S. PATENT DOCUMENTS

| | | | |
|---|---|---|---|
| 2005/0172000 A1* | 8/2005 | Nakamura | H04N 1/00204 709/224 |
| 2007/0146759 A1* | 6/2007 | Saito | G06F 3/1253 358/1.13 |
| 2007/0294672 A1* | 12/2007 | Mosuoka | G06Q 10/06 717/126 |
| 2010/0067035 A1* | 3/2010 | Kawakubo | G06F 3/1224 358/1.13 |
| 2010/0134832 A1* | 6/2010 | Numata | G06F 3/1204 358/1.15 |
| 2014/0368857 A1* | 12/2014 | Edamatsu | G06F 3/1225 358/1.13 |
| 2020/0257612 A1* | 8/2020 | Lang | G06F 11/3612 |

FOREIGN PATENT DOCUMENTS

| | | | |
|---|---|---|---|
| JP | 2005258499 | | 9/2005 |
| JP | 2014099697 | | 5/2014 |
| JP | 2020030392 A | * | 2/2020 |

\* cited by examiner

| APPLICATION NAME | FUNCTION | EFFECT MEASUREMENT PARAMETER | MEASUREMENT RESULT | |
|---|---|---|---|---|
| | | | BEFORE INTRODUCTION | AFTER INTRODUCTION |
| APPLICATION A | HIGH-PRECISION SCAN OCR | OCR SUCCESS RATE | 63% | 97% |
| APPLICATION B | SCAN TO DOCUMENT | TEXT CONVERSION SUCCESS RATE | – | 83% |
| APPLICATION C | MONOCHROMATIC CONVERSION AND PRINTING SPEED-UP UTILITY | PPM | 23 PPM | 45 PPM |
| ... | ... | ... | ... | ... |

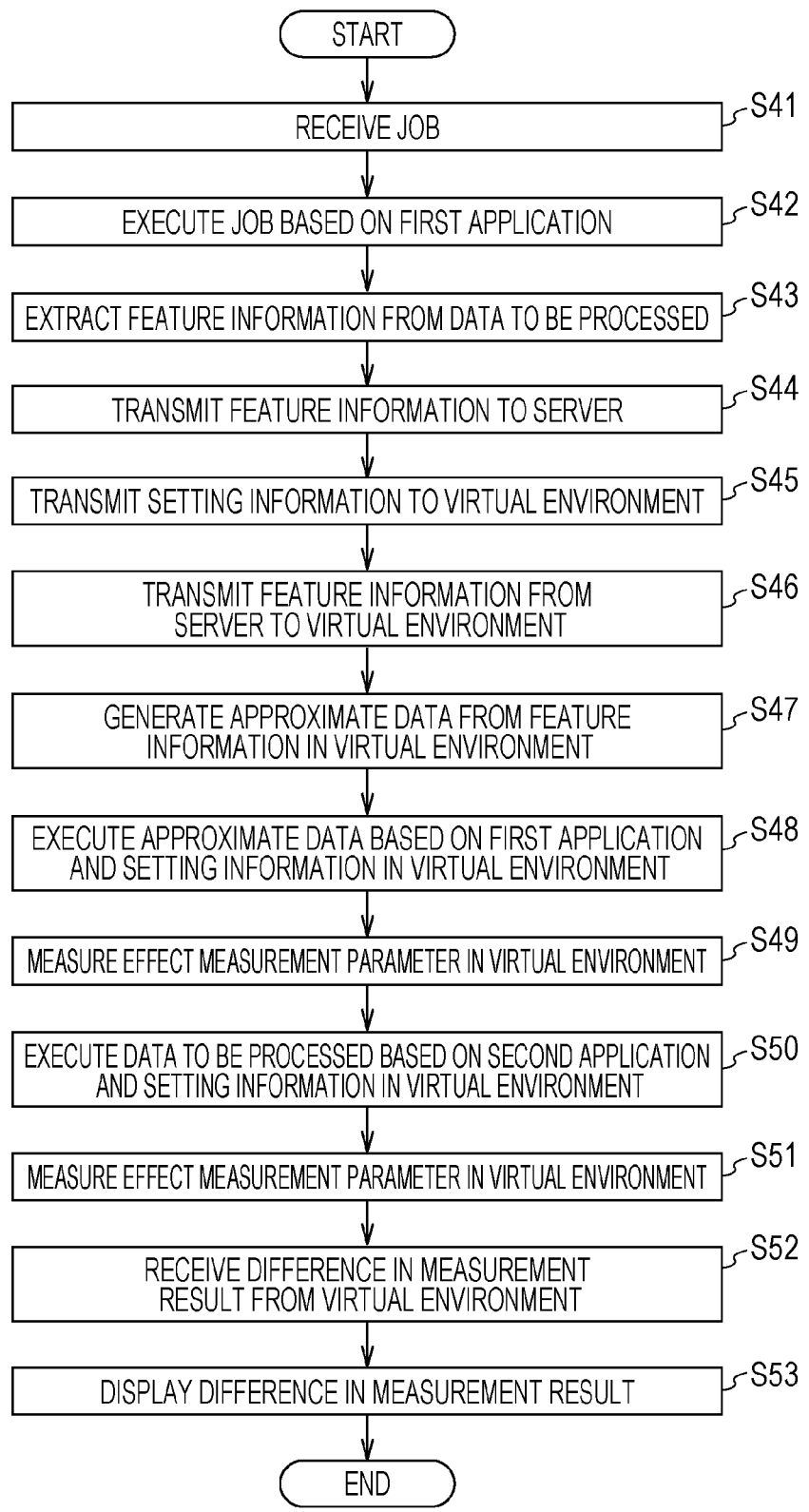

FIG. 10

| APPLICATION NAME | FUNCTION | EFFECT MEASUREMENT PARAMETER | MEASUREMENT RESULT | | PRICE | ECONOMIC BENEFIT | COST RECOVERY PERIOD |
|---|---|---|---|---|---|---|---|
| | | | BEFORE INTRODUCTION | AFTER INTRODUCTION | | | |
| APPLICATION A | HIGH-PRECISION SCAN OCR | OCR SUCCESS RATE | 63% | 97% | 168,000 YEN | 925,800 YEN/MONTH | 0.18 MONTHS |
| APPLICATION B | SCAN TO DOCUMENT | TEXT CONVERSION SUCCESS RATE | — | 83% | 48,000 YEN | 2,784 YEN/MONTH | 17.2 MONTHS |
| APPLICATION C | MONOCHROMATIC CONVERSION AND PRINTING SPEED-UP UTILITY | PPM | 23 PPM | 45 PPM | 19,800 YEN | 3,846 YEN/MONTH | 5.2 MONTHS |
| ⋮ | ⋮ | ⋮ | ⋮ | ⋮ | ⋮ | ⋮ | ⋮ |

210

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-053403 filed Mar. 20, 2019.

BACKGROUND

(i) Technical Field

The present disclosure relates to an information processing apparatus and a non-transitory computer readable medium.

(ii) Related Art

Recently, an introduction effect calculating device that quantifies an effect produced by apparatus introduction, i.e., a degree of change before and after apparatus introduction and allows a user to select a cost-effective apparatus introduction service by presenting the quantified effect so that a user's satisfaction level improves has been proposed (see, for example, Japanese Unexamined Patent Application Publication No. 2005-258499).

The introduction effect calculating device described in Japanese Unexamined Patent Application Publication No. 2005-258499 is a device that calculates an effect of apparatus introduction and includes a storage device in which an evaluation value concerning past apparatus introduction and cost of each apparatus are stored, an input unit that receives input of a contract parameter that is a weight of evaluation of a change of two or more states caused by apparatus introduction and is decided by a user of an apparatus introduction service and input of an evaluation value concerning apparatus introduction made this time, an estimation unit that reads out an evaluation value concerning past apparatus introduction corresponding to the apparatus introduction made this time from the storage device, calculates a difference between the evaluation value concerning the past apparatus introduction and the evaluation value concerning the apparatus introduction made this time, and estimates a return of a provider of the apparatus introduction service by multiplying the difference by the contract parameter, a presenting unit that presents apparatus introduction services and returns, an input unit that receives, from the service provide, selection of a high-return apparatus introduction service among the presented apparatus introduction services and returns, and a calculating unit that reads out an apparatus cost corresponding to the selected apparatus introduction service from the storage device and calculates a cost of the apparatus introduction service by multiplying the apparatus cost by a service charge rate of the provider.

SUMMARY

In a case where an effect of introduction of a product is predicted by using data for evaluation, the effect cannot be accurately predicted as compared with a case where actually-processed data is used.

Aspects of non-limiting embodiments of the present disclosure relate to providing an information processing apparatus and a non-transitory computer readable medium that present a difference between a data processing result before introduction of a product and a data processing result after introduction of the product by using actually-processed data.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a memory in which processing instruction information including data to be processed and setting information is stored; a first executing unit that executes processing of the data to be processed on a basis of a first product and the setting information; a first measurement unit that measures a predetermined item concerning a first processing result of the first executing unit; a second executing unit that executes processing of the data to be processed on a basis of a second product and the setting information; a second measurement unit that measures the item concerning a second processing result of the second executing unit; and an output unit that outputs a result of comparison between the first processing result and the second processing result on a basis of a measurement result of the first measurement unit and a measurement result of the second measurement unit.

BRIEF DESCRIPTION OF THE DRAWINGS

Exemplary embodiments of the present disclosure will be described in detail based on the following figures, wherein:

FIG. 3 illustrates an example of a measurement result table;

FIG. 9 is a flowchart illustrating an example of operation of an apparatus according to the third exemplary embodiment; and FIG. 10 illustrating another example of a measurement result table according to Modification 5.

DETAILED DESCRIPTION

Exemplary embodiments of the present disclosure are described below with reference to the drawings. Constituent elements having substantially identical functions are given identical reference signs, and repeated description thereof is omitted.

Summary of Exemplary Embodiments

An information processing apparatus according to the present exemplary embodiment includes a memory in which processing instruction information including data to be processed and setting information is stored; a first executing unit that executes processing of the data to be processed on the basis of a first product and the setting information; a first measurement unit that measures a predetermined item concerning a first processing result of the first executing unit; a second executing unit that executes processing of the data to be processed on the basis of a second product and the setting information; a second measurement unit that measures the item concerning a second processing result of the second executing unit; and an output unit that outputs a result of comparison between the first processing result and the second processing result on the basis of a measurement result of the first measurement unit and a measurement result of the second measurement unit.

The product is an application program (hereinafter also referred to as an "application") but may be a combination of an application program and hardware such as a post-processing device.

First Exemplary Embodiment

Figure 1:
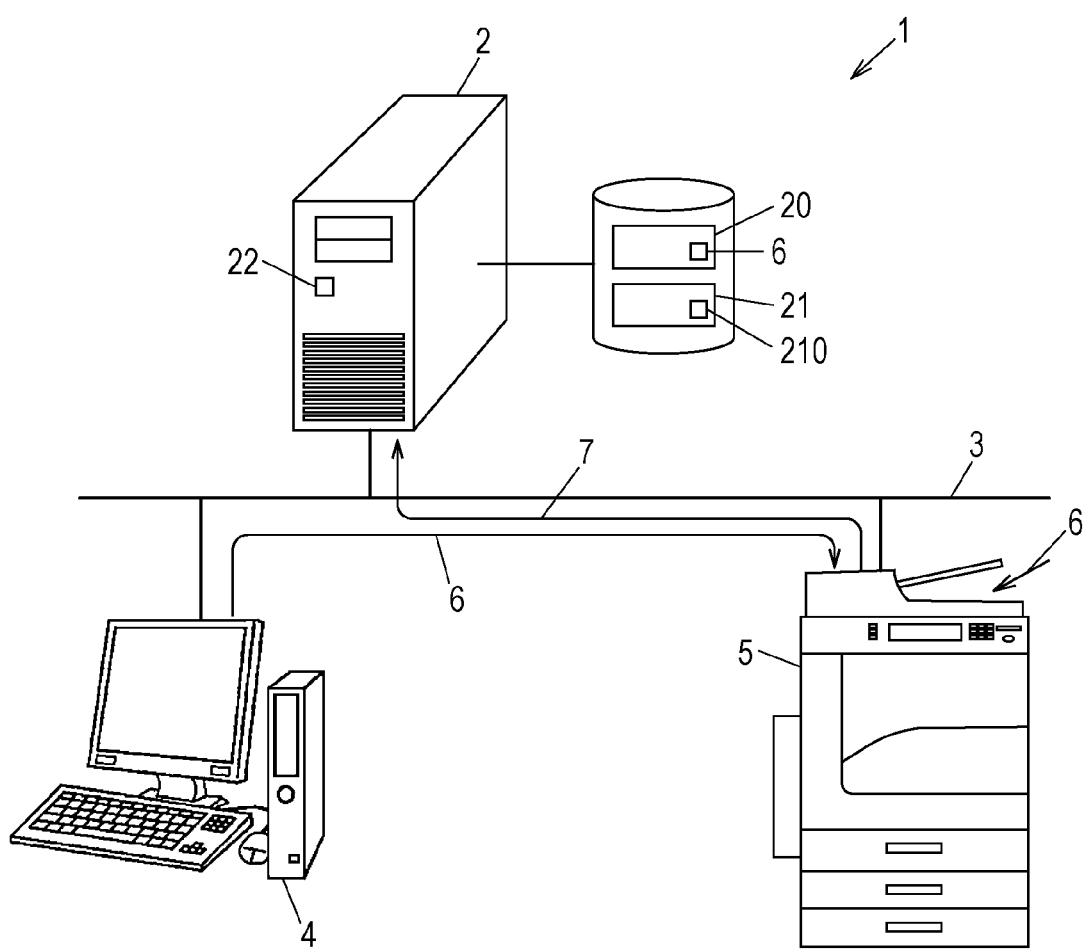
FIG. 1 illustrates an example of a configuration of an information processing system according to a first exemplary embodiment of the present disclosure.

FIG. 1 illustrates an example of a configuration of an information processing system according to a first exemplary embodiment of the present disclosure. The information processing system 1 includes a server 2 and a user terminal 4 and an apparatus 5 that are connected to the server 2 over a network 3. Although a single user terminal 4 and a single apparatus 5 are illustrated in FIG. 1, plural user terminals 4 and plural apparatuses 5 may be connected to the network 3. The information processing system 1, the server 2, or the apparatus 5 is an example of an information processing apparatus.

The server 2 includes a job storage unit 20 in which a job 6 is stored, a measurement result table storage unit 21 in which a measurement result table 210 (see FIG. 3) is stored, and an effect calculating unit 22 that calculates an effect of application introduction on the basis of a measurement result recorded in the measurement result table 210.

The user terminal 4 transmits the job 6 to the apparatus 5 over the network 3 and causes the apparatus 5 to execute the job 6. The job 6 includes data to be processed 60 and setting information 61. The setting information 61 includes a setting item and a setting value corresponding to the setting item. The job 6 is an example of processing instruction information.

The network 3 is, for example, a communication network such as a local area network (LAN) or an intranet.

In the present exemplary embodiment, the apparatus 5 is an image forming apparatus such as a multifunction printer. The multifunction printer has plural functions such as a copy function, a scan function, a print function, an e-mail transmission reception function, and a facsimile function. The apparatus may be a personal computer (PC) or the like.

Figure 2:
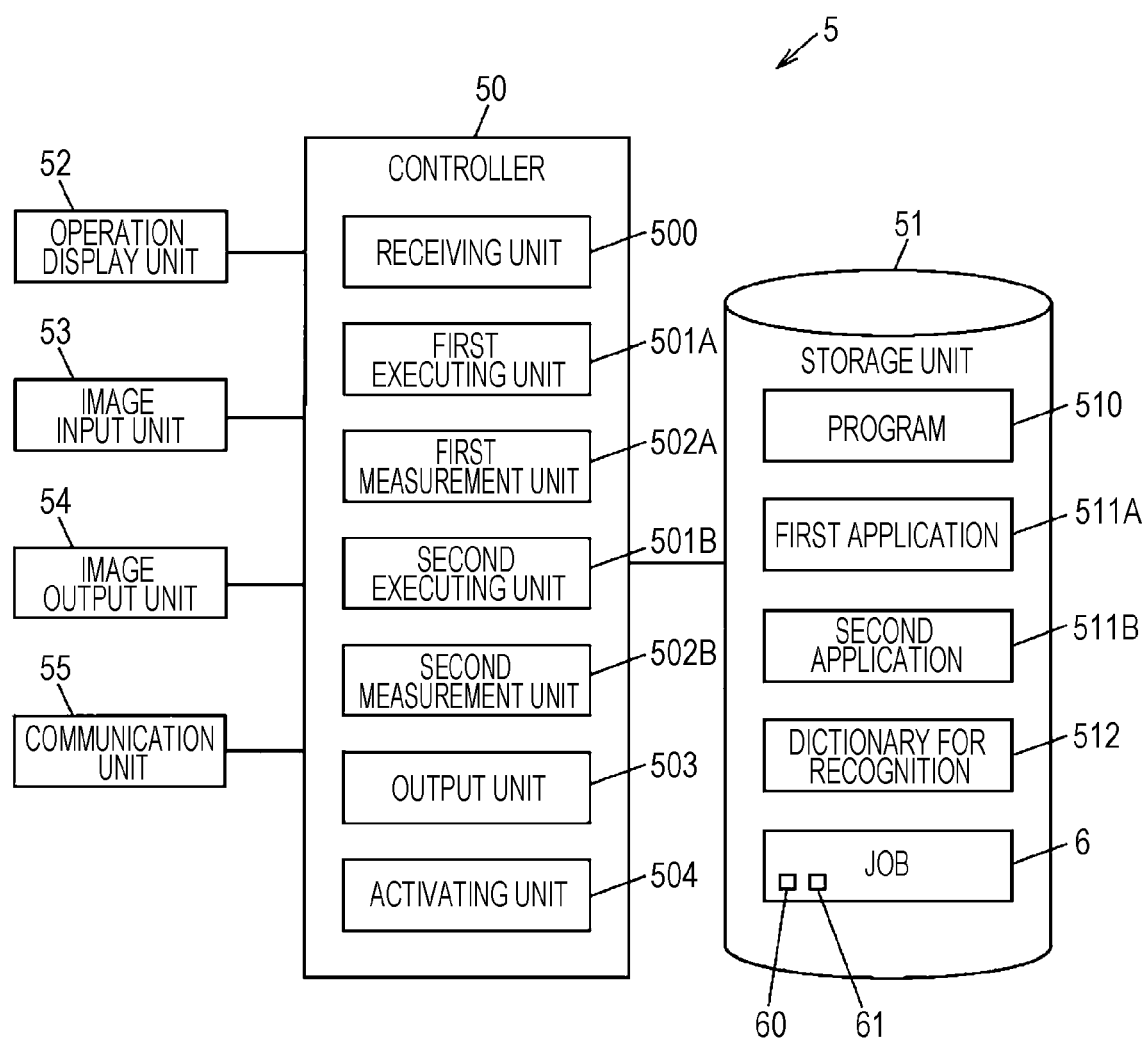
FIG. 2 is a block diagram illustrating an example of a control system of an apparatus.

FIG. 2 is a block diagram illustrating an example of a control system of the apparatus 5. The apparatus 5 includes a controller 50 that controls each unit of the apparatus 5, a storage unit 51 in which various kinds of information are stored, an operation display unit 52, an image input unit 53, an image output unit 54, and a communication unit 55 that performs communication over the network 3.

The controller 50 is constituted by a central processing unit (CPU), an interface, and the like. The CPU executes a program 510, a first application 511A, and a second application 511B and thus functions as a receiving unit 500, a first executing unit 501A, a first measurement unit 502A, a second executing unit 501B, a second measurement unit 502B, an output unit 503, an activating unit 504, and the like. The units 500 through 504 will be described later.

The storage unit 51 is constituted by a read only memory (ROM), a random access memory (RAM), a hard disk, and the like. In the storage unit 51, the program 510, the first application 511A, the second application 511B, a dictionary for recognition 512, and the like are stored, and the job 6 is temporarily stored.

Plural applications corresponding to respective functions are stored as the first application 511A and the second application 511B in the storage unit 51. The first application 511A is an example of a first product. The second application 511B is an example of a second product.

The following relationship is, for example, established between the first application 511A and the second application 511B:

(a) the first application 511A and the second application 511B have an identical function, and a version of the second application 511B is newer than a version of the first application 511A (b) the second application 511B is successor to the first application 511A and has a function improved or expanded as compared with the function of the first application 511A.

The operation display unit 52 is, for example, constituted by a display such as a liquid crystal display and a touch panel superimposed on the display. The operation display unit 52 displays information such as a setting screen on a display screen and receives a user's operation on the touch panel.

The image input unit 53 includes, for example, a scanner and an automatic document feeder and reads image data from a document placed on a document platen or a document fed from the automatic document feeder.

The image output unit 54 forms and outputs an image on a recording medium such as a sheet of paper, for example, by using a system such as an electrophotographic system or an inkjet system.

The communication unit 55 performs e-mail transmission reception control and control concerning a network and transmits and receives communication data over the network 3. Furthermore, the communication unit 55 transmits and receives information to and from an external device, for example, by e-mail or facsimile over the network 3.

FIG. 3 illustrates an example of the measurement result table 210. The measurement result table 210 has items such as an application name, a function, an effect measurement parameter, and a measurement result. The measurement result is divided into a measurement result before introduction of an application and a measurement result after introduction of the application. The effect measurement parameter is an item that depends on a function corresponding to an application name. The effect measurement parameter is an example of a predetermined item concerning a first processing result of the first executing unit 501A and a second processing result of the second executing unit 501B.

An application A has, for example, a high-precision scan OCR function. In high-precision scan OCR, processing such as extraction processing for extracting a character image from image data input by using the image input unit 53 or image data transmitted from the user terminal 4, recognition processing for recognizing a character from the extracted character image by using the dictionary for recognition 512, and calculation processing for calculating a character recognition rate in the recognition processing is performed.

An application B has, for example, a scan-to-document function. In scan-to-document, processing such as extraction processing for extracting elements that constitute a document such as a character image, a figure, or a table and information on a layout of these elements from image data input by using the image input unit 53 or image data transmitted from the user terminal 4, recognition processing for recognizing a character in the extracted character image by using the dictionary for recognition 512, conversion processing for converting a result of the recognition processing into a text, and processing for generating a document from the extracted text, the figure, the table, and the like by using the layout information is performed. Note that a case where the item concerning the measurement result before introduction is blank means that there is no corresponding old-version application.

An application C has, for example, a monochromatic conversion and printing speed-up utility function. The monochromatic conversion and printing speed-up utility has a function of converting color image data into monochromatic or grayscale image data and a function of performing printing at a high speed.

The "OCR success rate", which is an effect measurement parameter, is a percentage of characters whose recognition rate in optical character recognition (OCR) processing of the application A is equal to or larger than a threshold value (e.g., 95%). For example, in a case where the number of characters whose recognition rate is equal to or larger than 95% is 630 characters as a result of OCR processing of data to be processed including 1000 characters, the OCR success rate is 63%.

The "text conversion success rate", which is an effect measurement parameter, is a percentage of characters that can be converted into a text to all characters in a case where the application B is executed. For example, in a case where the number of characters that can be converted into a text in data to be processed including 1000 characters is 830, the text conversion success rate is 83%.

The "PPM", which is an effect measurement parameter, is "pages per minute" that can be processed per minute.

Next, the units 500 through 504 of the controller 50 of the apparatus 5 are described.

The receiving unit 500 receives a job 6 transmitted from the user terminal 4 or a job 6 input by an operation made on the operation display unit 52. Examples of the job 6 transmitted from the user terminal 4 include a print job for causing the image output unit 54 to print and output the data to be processed 60 on a sheet of paper. Examples of the job 6 input by an operation made on the operation display unit 52 include a scan job for causing the image input unit 53 to read image data, i.e., the data to be processed 60 from a document.

The first executing unit 501A controls the image input unit 53, the image output unit 54, or the communication unit 55 to execute the job 6 on the basis of the first application 511A.

The first measurement unit 502A measures an effect measurement parameter when the first executing unit 501A executes the job 6. For example, in a case where the effect measurement parameter is the OCR success rate, the number of all characters N recognized by the application A and the number of characters n whose recognition rate is equal to or larger than 95% are acquired from the application A, and the OCR success rate=(n/N)×100 is calculated. The first measurement unit 502A sometimes acquires an effect measurement parameter from the first executing unit 501A.

The second executing unit 501B controls the image input unit 53, the image output unit 54, or the communication unit 55 to execute the job 6 on the basis of the second application 511B in a case where the second application 511B has been activated by the activating unit 504.

The second measurement unit 502B measures an effect measurement parameter when the second executing unit 501B executes the job 6. The second measurement unit 502B sometimes acquires an effect measurement parameter from the second executing unit 501B.

The output unit 503 receives an application name and a difference in measurement result from the server 2 and causes the application name and the difference in measurement result to be displayed on the operation display unit 52. The difference in measurement result is an example of a result of comparison between the first processing result and the second processing result.

The activating unit 504 activates the second application 511B in a period preset as an unoccupied period, for example, by an administrator.

Operation of First Exemplary Embodiment

Figure 4:
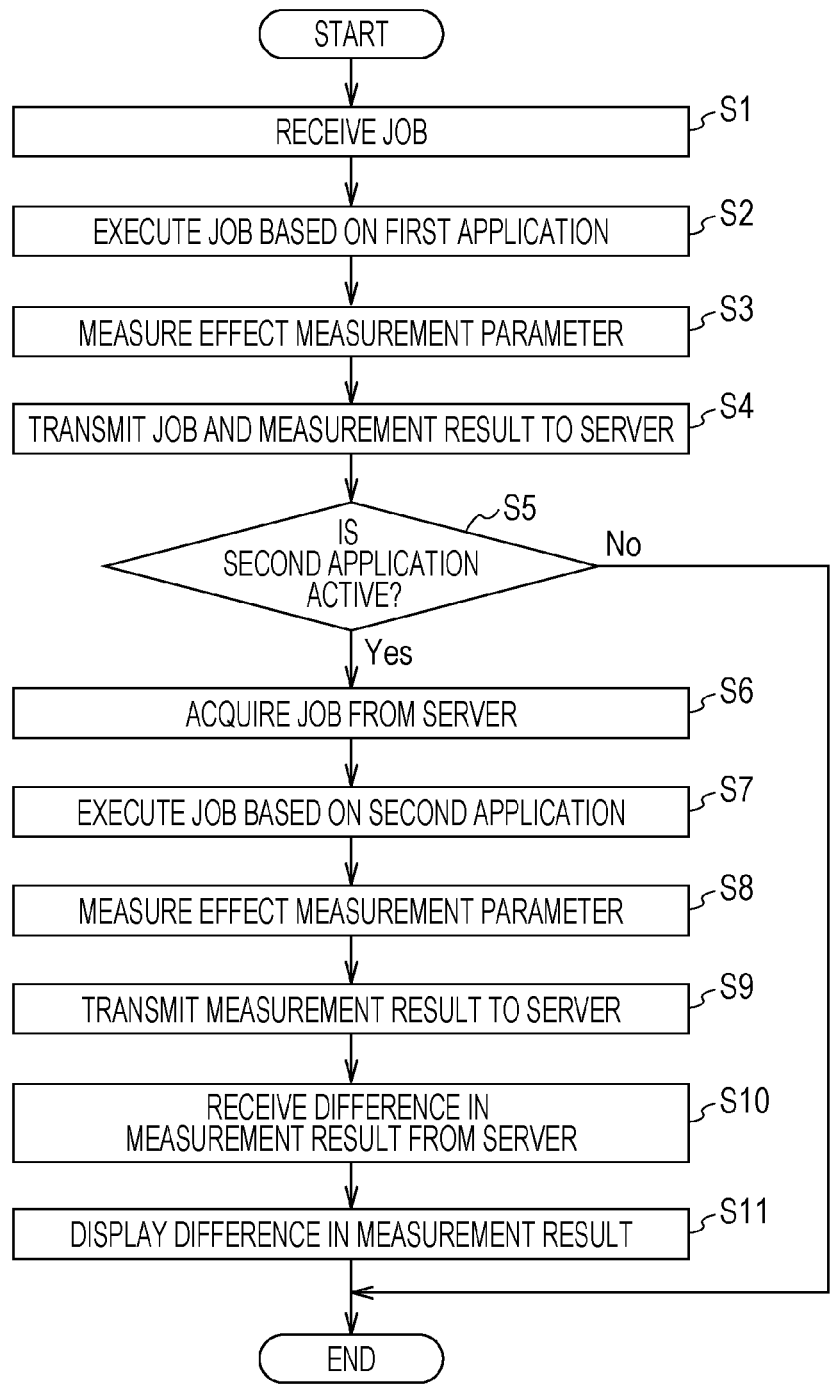
FIG. 4 is a flowchart illustrating an example of operation of the information processing system according to the first exemplary embodiment.

Next, an example of operation of the information processing system 1 is described with reference to FIG. 4. FIG. 4 is a flowchart illustrating an example of operation of the information processing system 1.

(1) Operation Based on First Application

The receiving unit 500 receives a job 6 (S1) and causes the job 6 to be stored in the storage unit 51. The first executing unit 501A controls the image input unit 53, the image output unit 54, or the communication unit 55 to execute the job 6 on the basis of the first application 511A (S2).

The first measurement unit 502A measures an effect measurement parameter when the first executing unit 501A executes the job 6 (S3).

The first measurement unit 502A transmits the job 6 and the measurement result 7 to the server 2 together with an application name (S4). The first measurement unit 502A deletes the job 6 from the storage unit 51 from the perspective of information leakage prevention.

The effect calculating unit 22 of the server 2 causes the transmitted job 6 to be stored in the job storage unit 20. In a case where the application name is the application A, the effect measurement parameter is the OCR success rate, and the measurement result 7 is 63%, the effect calculating unit 22 of the server 2 records the measurement result 7 that is 63% in the item concerning the measurement result before introduction corresponding to the application A in the measurement result table 210. The effect calculating unit 22 determines whether or not the transmitted application name is before introduction or after introduction, for example, on the basis of a version.

(2) Operation Based on Second Application

The activating unit 504 determines whether or not the second application 511B is active (S5). In a case where the second application 511B is not active (No in S5), the processing is finished.

In a case where the second application 511B is active (Yes in S5), the second executing unit 501B acquires the job 6 by accessing the server 2 and causes the job 6 to be stored in the storage unit 51 (S6). The server 2 deletes the job 6 from the job storage unit 20.

The second executing unit 501B controls the image input unit 53, the image output unit 54, or the communication unit 55 to execute the job 6 on the basis of the second application 511B (S7). The second executing unit 501B deletes the job 6 from the storage unit 51.

The second measurement unit 502B measures an effect measurement parameter when the second executing unit 501B executes the job 6 (S8).

The second measurement unit 502B transmits a measurement result 7 to the server 2 together with an application name (S9). In a case where the application name is the application A, the effect measurement parameter is the OCR success rate, and the measurement result 7 is 97%, the effect calculating unit 22 of the server 2 records the measurement result 7 that is 97% in the item concerning the measurement result after introduction corresponding to the application A in the measurement result table 210.

(3) Operation Concerning Introduction Effect

The effect calculating unit 22 of the server 2 finds a difference between the measurement result 7 before introduction of the second application 511B and the measurement result 7 after introduction of the second application 511B. As for the application A, the effect calculating unit 22 of the server 2 finds 97%−63%=34% as the difference in measurement result and transmits the difference (34%) in measurement result to the apparatus 5 together with the application name.

The output unit 503 receives the application name and the difference in measurement result from the server 2 (S10) and causes the application name and the difference in measurement result to be displayed on the operation display unit 52 (S11).

Second Exemplary Embodiment

Figure 5:
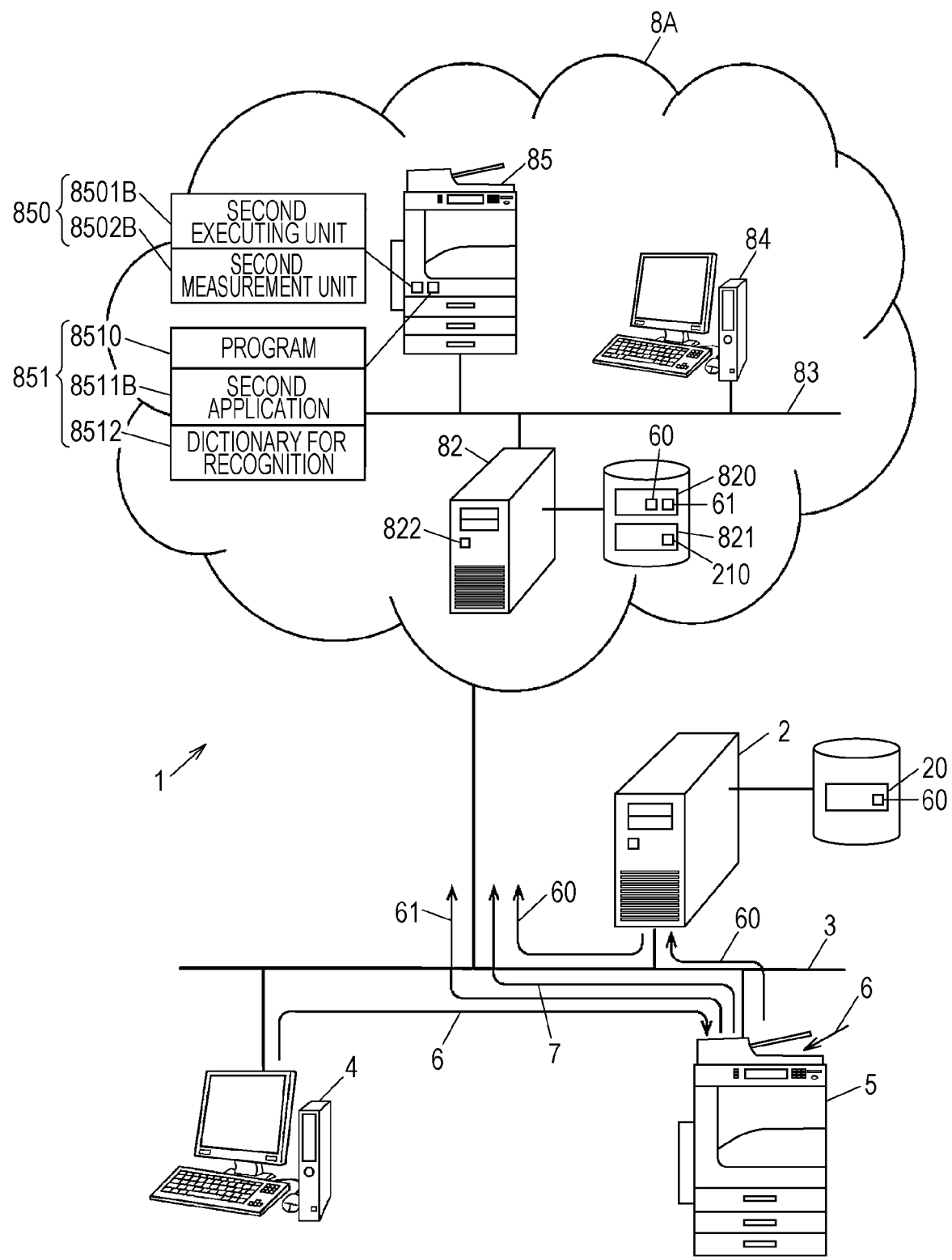
FIG. 5 illustrates an example of a configuration of an information processing system according to a second exemplary embodiment of the present disclosure.

FIG. 5 illustrates an example of a configuration of an information processing system according to a second exemplary embodiment of the present disclosure. In the present exemplary embodiment, a virtual environment 8A is provided in addition to the configuration of the first exemplary embodiment. Differences from the first exemplary embodiment are mainly described below.

The virtual environment 8A has elements that correspond to a server 2, a network 3, a user terminal 4, and an apparatus 5 in an actual environment. That is, the virtual environment 8A includes a virtual server 82 and a virtual user terminal 84 and a virtual apparatus 85 that are connected to the virtual server 82 over a virtual network 83. The information processing system 1, the virtual environment 8A, the virtual server 82, the virtual apparatus 85, or the apparatus 5 is an example of an information processing apparatus.

The virtual server 82 includes a job storage unit 820 in which data to be processed 60 and setting information 61 are stored, a measurement result table storage unit 821 in which a measurement result table 210 is stored, and an effect calculating unit 822 that calculates an effect of application introduction on the basis of a measurement result recorded in the measurement result table 210.

The virtual apparatus 85 includes a virtual controller 859, a storage unit 851, an operation display unit, an image input unit, an image output unit, and a communication unit that correspond to units 50 through 55 of the actual apparatus 5. The storage unit 851 is constituted by a read only memory (ROM), a random access memory (RAM), a hard disk, and the like. In the storage unit 851, a program 8510, a second application 8511B, a dictionary for recognition 8512, and the like are stored. The controller 850 is constituted by a CPU, an interface, and the like. The CPU of the controller 850 executes the program 8510 and the second application 8511B and thus functions as a second executing unit 8501B, a second measurement unit 8502B, and the like.

Operation of Second Exemplary Embodiment

Figure 6:
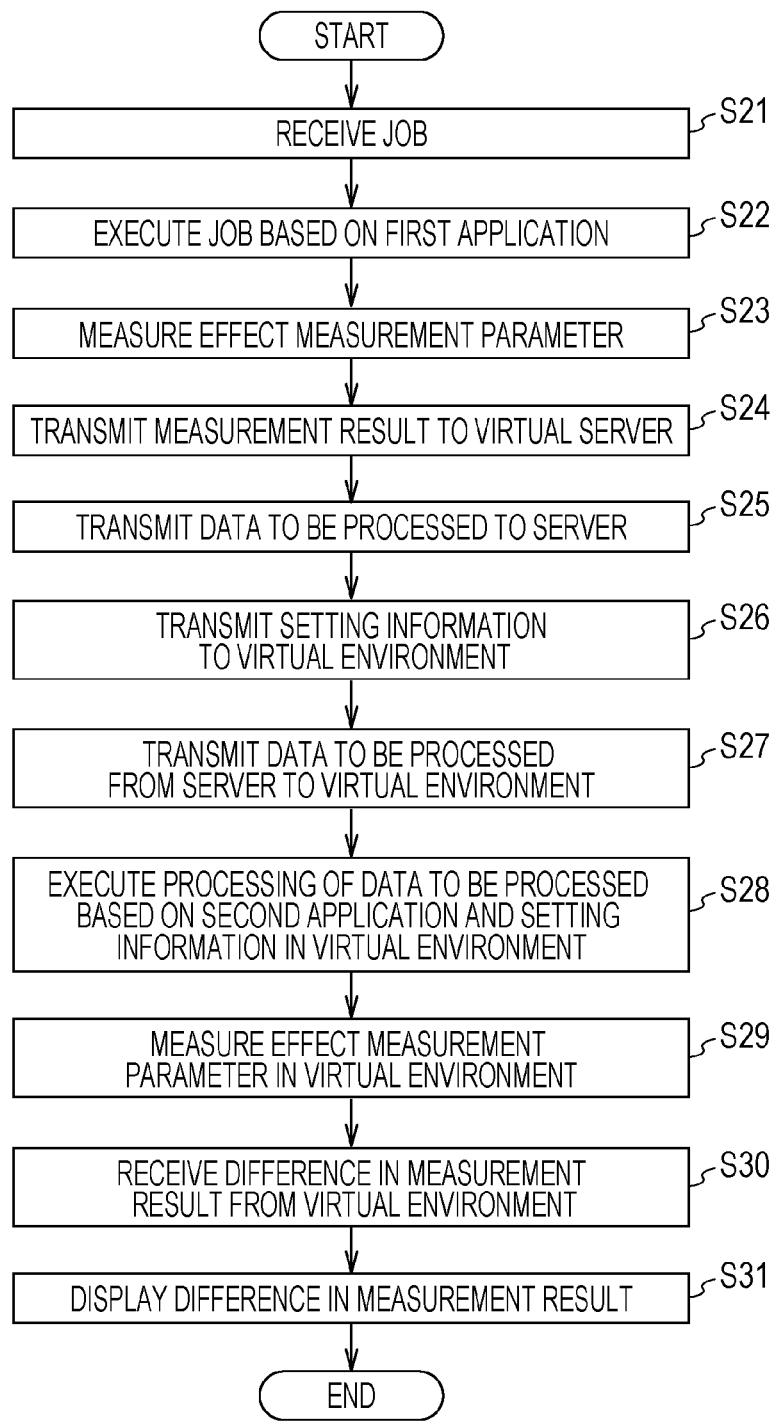
FIG. 6 is a flowchart illustrating an example of operation of the information processing system according to the second exemplary embodiment.

Next, an example of operation of the information processing system 1 is described with reference to FIG. 6. FIG. 6 is a flowchart illustrating an example of operation of the information processing system 1.

(1) Operation Based on First Application

A receiving unit 500 receives a job 6 (S21) and causes the job 6 to be stored in the storage unit 51. A first executing unit 501A controls the image input unit 53, the image output unit 54, or the communication unit 55 to execute the job 6 on the basis of a first application 511A (S22).

A first measurement unit 502A measures an effect measurement parameter when the first executing unit 501A executes processing (S23). The first measurement unit 502A transmits a measurement result 7 to the virtual server 82 of the virtual environment 8A together with an application name (S24).

The first executing unit 501A transmits the data to be processed 60 to the server 2 (S25). The server 2 causes the data to be processed 60 to be stored in the job storage unit 20.

The first executing unit 501A transmits the setting information 61 to the virtual environment 8A (S26). The effect calculating unit 822 of the virtual environment 8A causes the setting information 61 to be stored in the job storage unit 820. The first executing unit 501A deletes the job 6 from the storage unit 51.

The server 2 transmits the data to be processed 60 to the virtual environment 8A (S27). The effect calculating unit 822 of the virtual server 82 of the virtual environment 8A causes the data to be processed 60 to be stored in the job storage unit 820. The server 2 deletes the data to be processed 60 from the job storage unit 20.

(2) Operation Based on Second Application

The second executing unit 8510B of the virtual environment 8A acquires the data to be processed 60 and the setting information 61 by accessing the virtual server 82 and controls the image input unit, the image output unit, or the communication unit of the virtual environment 8A to execute processing of the data to be processed 60 on the basis of the second application 8511B and the setting information 61 (S28).

The second measurement unit 8502B measures an effect measurement parameter when the second executing unit 8501B executes the processing of the data to be processed 60 (S29). The second measurement unit 502B transmits a measurement result 7 to the virtual server 82. The effect calculating unit 822 of the virtual server 82 records the measurement result 7 in the item concerning the measurement result after introduction in the measurement result table 210.

(2) Operation Concerning Introduction Effect

The effect calculating unit 822 of the virtual environment 8A finds a difference between the measurement result 7 before introduction of the second application 8511B and the measurement result 7 after introduction of the second application 8511B and transmits the application name and the difference in measurement result to the apparatus 5.

The output unit 503 of the apparatus 5 receives the application name and the difference in measurement result from the virtual environment 8A (S30) and causes the application name and the difference in measurement result to be displayed on the operation display unit 52 (S31).

Third Exemplary Embodiment

Figure 7:
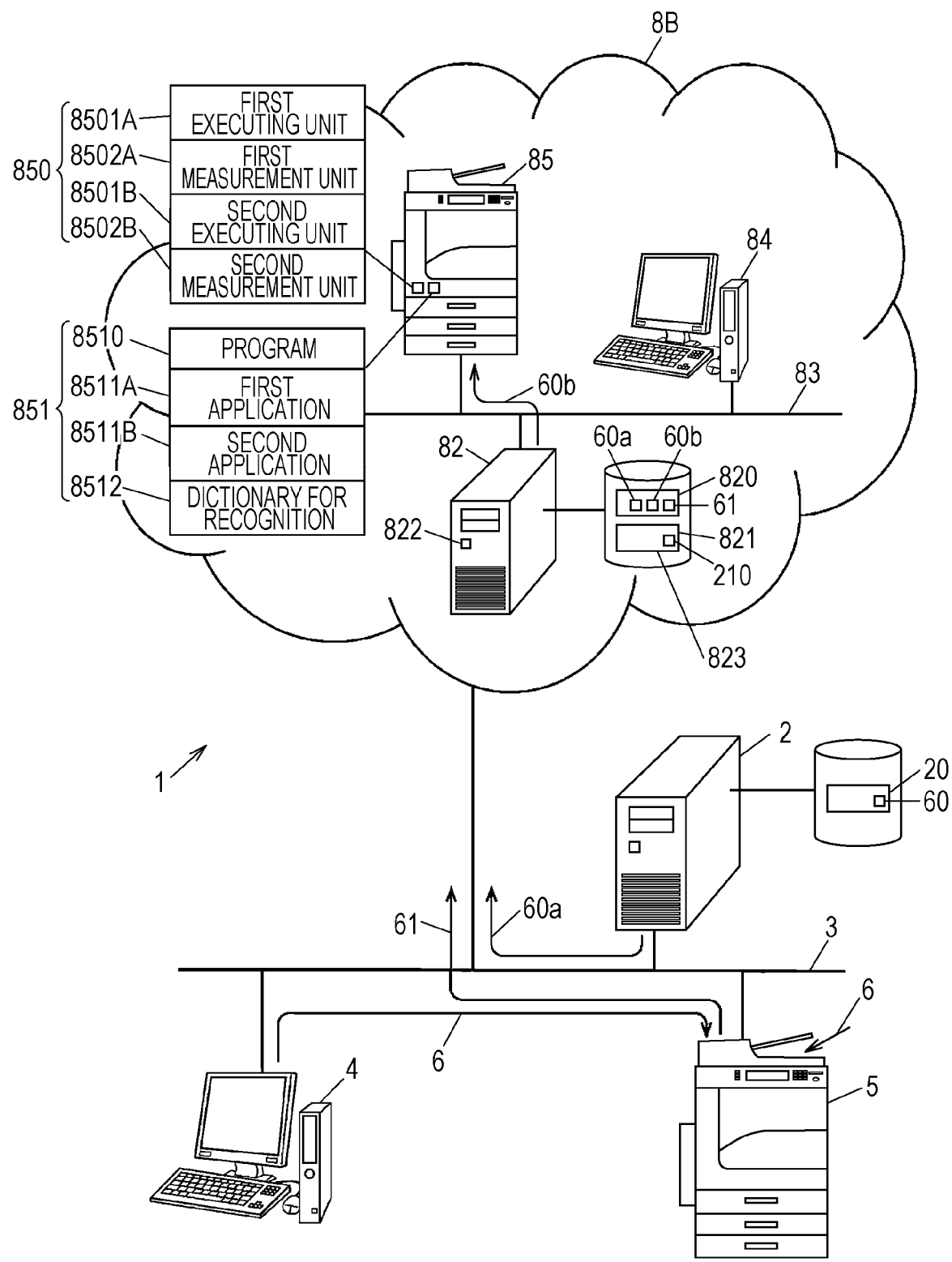
FIG. 7 illustrates an example of a configuration of an information processing system according to a third exemplary embodiment of the present disclosure.

FIG. 7 illustrates an example of a configuration of an information processing system according to a third exemplary embodiment of the present disclosure. In the present exemplary embodiment, a virtual environment 8B is provided in addition to the configuration of the first exemplary embodiment, and an amount of data transmitted to the virtual environment 8B is made smaller than that in the second exemplary embodiment. Differences from the first exemplary embodiment are mainly described below.

The virtual environment 8B has elements that correspond to a server 2, a network 3, a user terminal 4, and an apparatus 5 in an actual environment. That is, the virtual environment 8B includes a virtual server 82 and a virtual user terminal 84 and a virtual apparatus 85 that are connected to the virtual server 82 over a virtual network 83. The information processing system 1, the virtual environment 8B, the virtual server 82, the virtual apparatus 85, or the apparatus 5 is an example of an information processing apparatus.

The virtual server 82 includes a job storage unit 820 in which feature information 60a, approximate data 60b, and setting information 61 are stored, a measurement result table storage unit 821 in which a measurement result table 210 is stored, an effect calculating unit 822 that calculates an effect of application introduction on the basis of a measurement result recorded in the measurement result table 210, and a database 823 in which plural kinds of feature information 60a (see FIG. 8A) and plural pieces of approximate data 60b (see FIG. 8B) associated with the respective kinds of feature information 60a are stored. The feature information 60a is an example of extracted information.

The virtual apparatus 85 includes a virtual controller 859, a storage unit 851, an operation display unit, an image input unit, an image output unit, and a communication unit that correspond to units 50 through 55 of the actual apparatus 5. The storage unit 851 is constituted by a read only memory (ROM), a random access memory (RAM), a hard disk, and the like. In the storage unit 851, a program 8510, a first application 8511A, a second application 8511B, a dictionary for recognition 8512, and the like are stored. The controller 850 is constituted by a CPU, an interface, and the like. The CPU of the controller 850 executes the program 8510, the first application 8511A, or the second application 8511B and thus functions as a first executing unit 8501A, a first measurement unit 8502A, a second executing unit 8501B, a second measurement unit 8502B, and the like.

A first executing unit 501A of the apparatus 5 in the actual environment executes a job 6 as in the first exemplary embodiment and extracts feature information 60a from data to be processed 60.

Figure 8A:
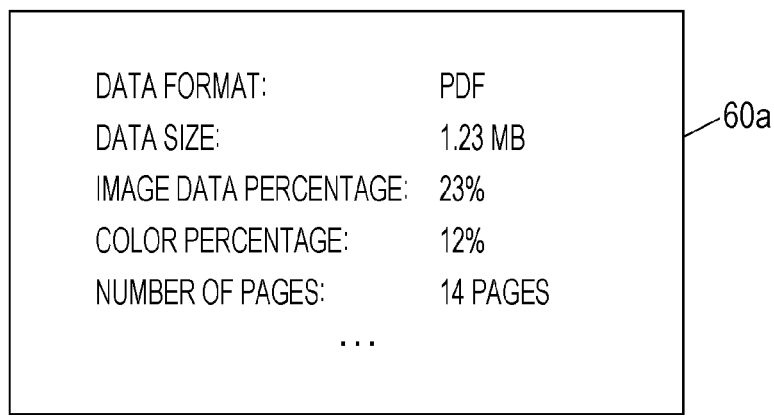
FIG. 8A illustrates an example of feature information.

FIG. 8A illustrates an example of the feature information 60a. The feature information 60a has, for examples, items such as a data format, a data size, an image data percentage, a color percentage, and the number of pages. The feature information 60a may further include a font size, client information, a time stamp, and the like.

The effect calculating unit 822 of the virtual server 82 generates approximate data 60b from the feature information 60a.

Figure 8B:
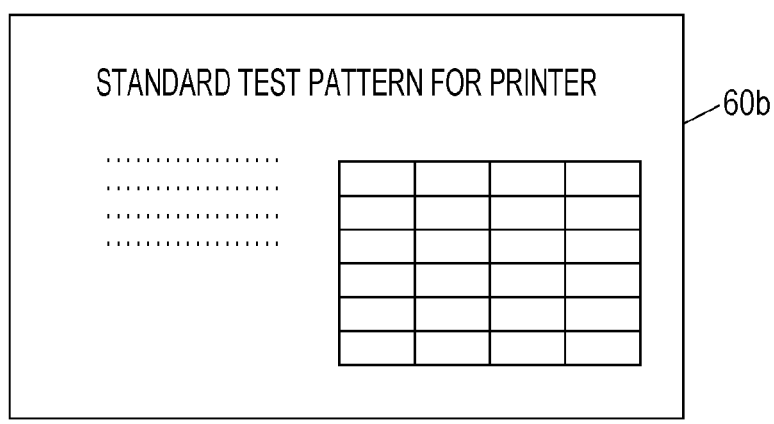
FIG. 8B illustrates an example of approximate data.

FIG. 8B illustrates an example of the approximate data 60b. The effect calculating unit 822 acquires the approximate data 60b corresponding to the feature information 60a from the database 823.

Operation of Third Exemplary Embodiment

Next, an example of operation of the information processing system 1 is described with reference to FIG. 9. FIG. 9 is a flowchart illustrating an example of operation of the information processing system 1.

(1) Operation Based on First Application

A receiving unit 500 receives a job 6 (S41) and causes the job 6 to be stored in the storage unit 51. The first executing unit 501A controls the image input unit 53, the image output unit 54, or the communication unit 55 to execute the job 6 on the basis of a first application 511A (S42).

The first executing unit 501A extracts feature information 60a from the data to be processed 60 (S43) and transmits the feature information 60a to the server 2 (S44). The server 2 causes the feature information 60a to be stored in the job storage unit 20.

The first executing unit 501A transmits the setting information 61 to the virtual environment 8B (S45). The effect calculating unit 822 of the virtual environment 8B causes the setting information 61 to be stored in the job storage unit 820.

The server 2 transmits the feature information 60a to the virtual environment 8B (S46). The effect calculating unit 822 of the virtual server 82 of the virtual environment 8B causes the feature information 60a to be stored in the job storage unit 820. The effect calculating unit 822 generates approximate data 60b from the feature information 60a and causes the approximate data 60b to be stored in the job storage unit 820 (S47). The server 2 deletes the feature information 60a from the job storage unit 20.

The first executing unit 8501A of the virtual environment 8B acquires the approximate data 60b and the setting information 61 from the virtual server 82 and executes processing of the approximate data 60b on the basis of the first application 8511A and the setting information (S48).

The first measurement unit 8502A of the virtual environment 8B measures an effect measurement parameter when the first executing unit 8501A executes the processing (S49). The first measurement unit 8502A transmits a measurement result 7 to the virtual server 82 of the virtual environment 8B together with an application name. The effect calculating unit 822 of the virtual server 82 records the measurement result 7 in the item concerning the measurement result before introduction in the measurement result table 210.

(2) Operation Based on Second Application

The second executing unit 8501B of the virtual environment 8B acquires the approximate data 60b and the setting information 61 by accessing the virtual server 82 and controls the image input unit, the image output unit, or the communication unit to execute the processing of the approximate data 60b on the basis of the second application 8511B and the setting information 61 (S50).

The second measurement unit 852B measures an effect measurement parameter when the second executing unit 8501B executes the processing of the approximate data 60b (S51). The second measurement unit 8502B transmits a measurement result 7 to the virtual server 82. The effect calculating unit 822 of the virtual server 82 records the measurement result 7 in the item concerning the measurement result after introduction in the measurement result table 210.

(3) Operation Concerning Introduction Effect

The effect calculating unit 822 of the virtual environment 8B finds a difference between the measurement result 7 before introduction of the second application 8511B and the measurement result 7 after introduction of the second application 8511B and transmits the application name and the difference in measurement result to the apparatus 5.

The output unit 503 of the apparatus 5 receives the application name and the difference in measurement result from the virtual environment 8B (S52) and causes the application name and the difference in measurement result to be displayed on the operation display unit 52 (S53).

Modification 1

Although a difference in measurement result is calculated in the server 2 in the first exemplary embodiment, a difference in measurement result may be calculated in the apparatus 5. In this case, the server 2 need not be provided.

Modification 2

Although an effect measurement parameter concerning a first application is measured on an actual environment side and an effect measurement parameter concerning a second application is measured in the virtual environment 8A in the second exemplary embodiment, the effect measurement parameter concerning the first application may also be measured in the virtual environment 8A.

Modification 3

Although the feature information 60a is transmitted from the actual environment to the virtual environment 8B in the third exemplary embodiment, part (e.g., the first page) of the data to be processed 60 and feature information 60a of other pages may be transmitted to the virtual environment 8B.

Modification 4

In the third exemplary embodiment, only a page for which a measurement result is equal to or smaller than a predetermined value may be transmitted to the virtual environment 8B.

Modification 5

FIG. 10 illustrates another example of the measurement result table 210. The measurement result table 210 illustrated in FIG. 10 has items such as a price, an economic benefit, and a cost recovery period in addition to the items illustrated in FIG. 3. The effect calculating unit 22 may calculate values of the economic benefit and the cost recovery period.

For example, the economic benefit and the cost recovery period can be calculated by the following calculation method by using data input by an administrator and data collected by the apparatus 5.

In the case of the application A, examples of the data input by the administrator before introduction of the second application include average correction period (e.g., 0.7 h) per page in failed OCR and employee average cost (e.g., 3,000 yen/h).

Examples of the data collected by the apparatus 5 include the number of used pages of OCR (e.g., 480 pages) per month.

A calculation method of the economic benefit and the cost recovery period is as follows:

(a) OCR correction period per page

In a case where the OCR correction period per page, which is 0.7 h before introduction of the application, becomes 0.057 h after introduction of the application due to a rise in OCR success rate from 63% to 97%, the OCR correction period per page is calculated as follows. Note that the OCR correction period is a period for correction of an OCR result.

$$0.7 \text{ h}/(100-63)*(100-97)=0.057$$

(b) OCR correction period per month

The OCR correction period per month before introduction is calculated as follows: 0.7 h×480=336 h, and the OCR correction period per month after introduction is calculated as follows: 0.057 h×480=27.4 h.

(c) Effect of reduction of OCR correction period per month

The effect of reduction of OCR correction period per month is calculated as follows: 336 h−27.4 h=308.6 h (d) economic benefit The economic benefit is, for example, calculated as follows: 3,000 yen/h (employee average cost)×308.6 h=925,800 yen.

(e) cost recovery period

The cost recovery period is, for example, calculated as follows: 168,000 yen (price of the product)/925,800 yen (economic benefit)=0.18 months.

Although the exemplary embodiments of the present disclosure have been described above, the exemplary embodiments of the present disclosure are not limited to the above exemplary embodiments and can be modified in various ways without departing from the spirit of the present disclosure.

A part or all of the units of the controller 50, 850 may be constituted by a hardware circuit such as a field programmable gate array (FPGA) or an application specific integrated circuit (ASIC).

One or more of the constituent elements of the above exemplary embodiments may be omitted or changed without departing from the spirit of the present disclosure.

In the flows of the above exemplary embodiments, a step can be, for example, added, deleted, changed, or replaced without departing from the spirit of the present disclosure. The program used in the above exemplary embodiments may be provided by being recorded on a computer-readable recording medium such as a CD-ROM. Furthermore, the program used in the above exemplary embodiments may be stored in an external server such as a cloud server and used over a network.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
   a memory in which processing instruction information including data to be processed and setting information is stored;
   a processor, configured to:
      execute processing of the data to be processed on a basis of a first product introduced in the information processing apparatus and the setting information to generate a first processing result;
      measure a predetermined item concerning the first processing result to generate a first measurement result, wherein the execution to generate the first processing result and the first measurement result are performed in the information processing apparatus into which the first product has been introduced;
      transmit extracted information extracted from the data to be processed from the information processing apparatus to a virtual environment, wherein the virtual environment generates approximate data approximate to the data to be processed from the extracted information;

cause to generate approximate data approximate to the data to be processed from the extracted information and to execute processing of the approximated data on a basis of a second product and the setting information to generate a second processing result in the virtual environment;

cause to measure an item concerning the second processing result to generate a second measurement result in the virtual environment; and output a result of comparison between the first processing result and the second processing result on a basis of the first measurement result and the second measurement result, wherein the first product is a first application without a predetermined function, and the second product is the first application with the predetermined function.

2. A non-transitory computer readable medium storing a program causing a computer to execute a process, the process comprising:

executing processing of data to be processed on a basis of a first product introduced in the computer and setting information to generate a first processing result;

measuring a predetermined item concerning the first processing result to generate a first measurement result, wherein the execution to generate the first processing result and the first measurement result are performed in the computer into which the first product has been introduced;

transmitting extracted information extracted from the data to be processed from the computer to a virtual environment, wherein the virtual environment generates approximate data approximate to the data to be processed from the extracted information;

causing to generate approximate data approximate to the data to be processed from the extracted information and to execute processing of the approximated data on a basis of a second product and the setting information to generate a second processing result in the virtual environment;

causing to measure an item concerning the second processing result to generate a second measurement result in the virtual environment; and outputting a result of comparison between the first processing result and the second processing result on a basis of the first measurement result and the second measurement result, wherein the first product is a first application without a predetermined function, and the second product is the first application with the predetermined function.

\* \* \* \* \*